United States Patent
Niepel et al.

(12) 
(10) Patent No.: US 6,671,523 B1
(45) Date of Patent: Dec. 30, 2003

(54) METHOD FOR OPERATING A COMMUNICATION TERMINAL

(75) Inventors: Alexander Niepel, München (DE); Uve Reimer, Berlin (DE); Michael Rüssmann, München (DE)

(73) Assignee: Siemens Aktiengesellschaft, Munich (DE)

(*) Notice: Subject to any disclaimer, the term of this patent is extended or adjusted under 35 U.S.C. 154(b) by 330 days.

(21) Appl. No.: 09/677,413

(22) Filed: Oct. 2, 2000

(30) Foreign Application Priority Data

Sep. 30, 1999 (DE) .......................... 199 47 077

(51) Int. Cl.[7] .................. H04M 1/00; H04B 1/38
(52) U.S. Cl. ............. 455/558; 455/551; 455/435.1; 455/433; 455/557
(58) Field of Search ................ 455/418, 433, 455/435, 550, 558, 405, 406, 410, 411, 414, 565, 566, 567

(56) References Cited

U.S. PATENT DOCUMENTS

| | | | | |
|---|---|---|---|---|
| 5,530,736 A | * | 6/1996 | Comer et al. .......... | 455/458 |
| 6,026,291 A | * | 2/2000 | Carlsson et al. ....... | 455/406 |
| 6,108,540 A | * | 8/2000 | Sonti et al. ........... | 455/433 |
| 6,212,372 B1 | * | 4/2001 | Julin ................... | 455/418 |

FOREIGN PATENT DOCUMENTS

DE  43 17 143 C2  2/1999

OTHER PUBLICATIONS

G.P. Eleftheriadis and M.E. Theologou, "User profile identification in future Mobile telecommunications systems", IEEE network, Sept/Oct. 1994, pp. 33–39.*

Sundborg, "Universal personal telecommunication concept and standardisation", Ericsson review No. 4, 1993, pp. 140–155.*

"GSM 02.97 V7.0.0 (Apr. 1998), Technical Specification, Digital cellular telecommunications system (Phase 2+);" pp. 2–15, as mentioned on p. 2 of the specification.

* cited by examiner

*Primary Examiner*—Duc Nguyen
(74) *Attorney, Agent, or Firm*—Laurence A. Greenberg; Werner H. Stemer; Ralph E. Locher

(57) ABSTRACT

A method is described in which a number of subscriber profiles are flexibly allocated to a subscriber identity module. The subscriber has a subscriber identity module in his terminal. The terminal is also associated with a subscriber identity number. However, the subscriber identity number can be associated with two or more directory numbers that are distinguished by different associated subscriber profiles. The subscriber profiles are available and can be administered in a suitable manner in the network. Depending on the current status of the profile (activated/deactivated), a mobile-terminated call is switched through or diverted, e.g. to a so-called "voice mailbox", that is to say an answering machine.

13 Claims, 2 Drawing Sheets

| SIM | MSISDN | IMSI | O-CSI | T-CSI | SCP | Profile |
|---|---|---|---|---|---|---|
| SIM1 | MSISDNa | IMSI1 | | | SCPa | a |
| SIM1 | MSISDNb | IMSI1 | | | SCPa | b |
| SIM2 | MSISDNc | IMSI2 | | | | c |
| ... | | | | | | |

Fig. 2

| SIM | MSISDN | IMSI | O-CSI | T-CSI | SCP | Profile |
|---|---|---|---|---|---|---|
| SIM1 | MSISDNa | IMSI1 | | | SCPa | a |
| SIM1 | MSISDNb | IMSI1 | | | SCPa | b |
| SIM2 | MSISDNc | IMSI2 | | | | c |
| ... | | | | | | |

METHOD FOR OPERATING A COMMUNICATION TERMINAL

BACKGROUND OF THE INVENTION

Field of the Invention

The invention relates to a method for operating a communication terminal in a communication network, especially a mobile radio telephone in a mobile radio network. The communication terminal can be identified by a subscriber identity number (in global systems for mobile communications (GSM), for example, the so-called international mobile station identity (IMSI)). This is usually stored in a subscriber identity module (SIM).

The identity number is linked to a subscriber profile in the subscriber register (e.g. a home location register (HLR)). For each subscriber, one directory number is issued and one bill is created.

It is not possible to separate various types of use (e.g. office and private).

In the meantime, many telecommunication users have a number of mobile transceivers, one for private use and one for the office, for example. To implement separate directory numbers, bills, service authorizations etc., two subscriber identity modules (SIM) must be bought at present. Exchanging the modules in a terminal is impractical and, in addition, the user could always be reached under only one of the directory numbers.

In German Patent DE 43 17 143 C2, a method is described in which two or more subscriber identity modules are allocated to one subscriber. The associated entries in a database (for example the home location register in the case of GSM) are linked to one another, the respective record belonging to the subscriber identity module which is currently being used is activated. However, the other linked records can, but do not need to be, activated. It is possible to switch a call diversion—to the activated number or to a voice mailbox. In this case a data field in the home location register for the call forwarding is used for other purposes.

In printed document GSM 02.97 (SMG version only, not for publication), a service having the designation "multiple subscriber profile" is also described. It is also implemented, i.e. stored, controlled and managed, via the home location register.

SUMMARY OF THE INVENTION

It is accordingly an object of the invention to provide a method for operating a communication terminal which overcomes the above-mentioned disadvantages of the prior art methods of this general type, which allocates a number of subscriber profiles flexibly to one subscriber identity module resulting in simple and convenient administration of the subscriber profiles.

With the foregoing and other objects in view there is provided, in accordance with the invention, a method for operating in a communications network. The method includes the steps of providing a communication terminal having a subscriber identity number associated with at least two directory numbers and each of the directory numbers is associated with a subscriber profile; and determining the subscriber profile to be used in a call to or from the communication terminal using a services logic in the communications network.

In the method, the subscriber has a subscriber identity module (SIM) in his terminal. Furthermore, the SIM has an associated subscriber identity number. However, the subscriber identity number can be associated with two or more directory numbers which are distinguished by different associated subscriber profiles. The subscriber profiles are suitably available and can be administered in the network, for example accessible via the home location register as was hitherto usual. A services logic which is located in the communication network decides which of the profiles is used in the case of a call.

The procedure according to the invention has the advantage that a subscriber no longer needs to carry with him two different terminals, for example for private use and for office use. It is then possible to administer separate call categories, to carry out separate billing and to provide separately services such as, for example, a timed call diversion.

A special advantage compared with the previously known implementations is the so-called "online billing" which results in that, for example, certain call categories (such as private calls) can be billed separately in advance (prepaid).

When the profiles are used, a distinction is also made between mobile-terminated and mobile-originated calls. The type of mobile-terminated call (MTC) can be recognized from the original number dialed, i.e. from the MSISDN that is addressed in the subscriber register. This specifies the subscriber profile to be selected.

Other possibilities are also conceivable, however, especially when the call is not triggered by a second mobile telephone but by another terminal, for example a PC or a second transport network is used. In the case of mobile-originated calls (MOC), the user decides by the dialing procedure, for example by a special character such as "*" or "#" at the beginning or the end of the dialed number which category the current call belongs to.

The individual subscriber profiles are administered via the communication network as before. This is possible in a very convenient manner, for example web-based by HTML or WAP web pages.

The subscriber profiles can also be activated and deactivated in this manner or directly via the terminal.

Depending on the current status of the profile (activated/deactivated), a mobile-terminated call is switched through or diverted, e.g. to a so-called voice mailbox, that is to say an answering machine. The diversion can also be controlled via time information apart from the activation status of the relevant profile.

Thus, a subscriber profile used for business purposes may be activated, for example, only on weekdays from 8 a.m. to 6 p.m. and all calls arriving for this directory number outside this time are forwarded to the voice mailbox or, for example, another number (hotline).

In one embodiment of the invention, incoming calls can be distinguished by signaling to the subscriber, for example by various types of symbols which indicate whether this is a "business" call or a "private" call on the display of the mobile telephone. The subscriber profile can also contain a specific call signal (ringing tone) for the respective incoming call, if this is supported by the terminal, which ringing tone immediately informs the subscriber about whether this is a call to his private number or his business number.

Depending on the selected subscriber profile in the case of a mobile-originated call, for example, the billing model is specified and an account number corresponding to the category is entered in the billing records.

In another embodiment, it is conceivable that only one of the subscriber profiles is activated at one time. Therefore, as soon as the subscriber activates a deactivated subscriber profile (either by use or by a concrete activation action), the subscriber profile hitherto activated is deactivated.

In another advantageous embodiment, the subscriber profile contains lists of permissible or impermissible numbers, the so-called 'White List'. A call is only permissible from and/or to these numbers. If a call arrives from another number, this call is diverted to a voice mailbox or to the other directory number of the subscriber in accordance with the settings in the subscriber profile.

In regards to a 'Black List', if a call comes from one of the numbers contained in this list and/or the subscriber attempts to call a number in this list, this will be prevented or, for example, diverted to another profile of the subscriber.

In accordance with an added feature of the invention, there is the step of using a directory number dialed to indicate to the services logic the subscriber profile to be used for a mobile-terminate call.

In accordance with an additional feature of the invention, there is the step of indicating, one of visually and audibly, a directory number to which the call was directed for a mobile-terminated call.

In accordance with another feature of the invention, there is the step of indicating the subscriber profile to be used by additional signaling to the services logic from one of a user and the communications terminal for a mobile-originated call.

In accordance with a further feature of the invention, a user using the communication terminal can activate and deactivate the subscriber profile.

In accordance with a further added feature of the invention, the user using the communications network can administer the subscriber profiles.

In accordance with a further additional feature of the invention, there is the step of providing the subscriber profile with billing information.

In accordance with another added feature of the invention, there is the step of providing the subscriber profile with time information for deciding on activations and deactivations of the directory numbers.

In accordance with another additional feature of the invention, there is the step of providing the subscriber profile with information about which communication partners a call setup with is permissible.

In accordance with a feature of the invention, there is the step of activating only one of the directory numbers having the subscriber profile at a time for the subscriber identity number.

In accordance with another feature of the invention, there is the step of collecting calls for non-activated directory numbers in a mailbox.

In accordance with a further feature of the invention, there is the step of providing the communication network as a mobile radio network.

In accordance with a concomitant feature of the invention, there is the step of providing the subscriber profile with information about which communication partners a call setup with is impermissible.

Other features which are considered as characteristic for the invention are set forth in the appended claims.

Although the invention is illustrated and described herein as embodied in a method for operating a communication terminal, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 2 is a table of an exemplary subscriber register, specifically the home location register, with reference to a number of subscriber profiles which are linked by use of a SIM/IMSI.

DESCRIPTION OF THE PREFERRED EMBODIMENTS

Figure 1:
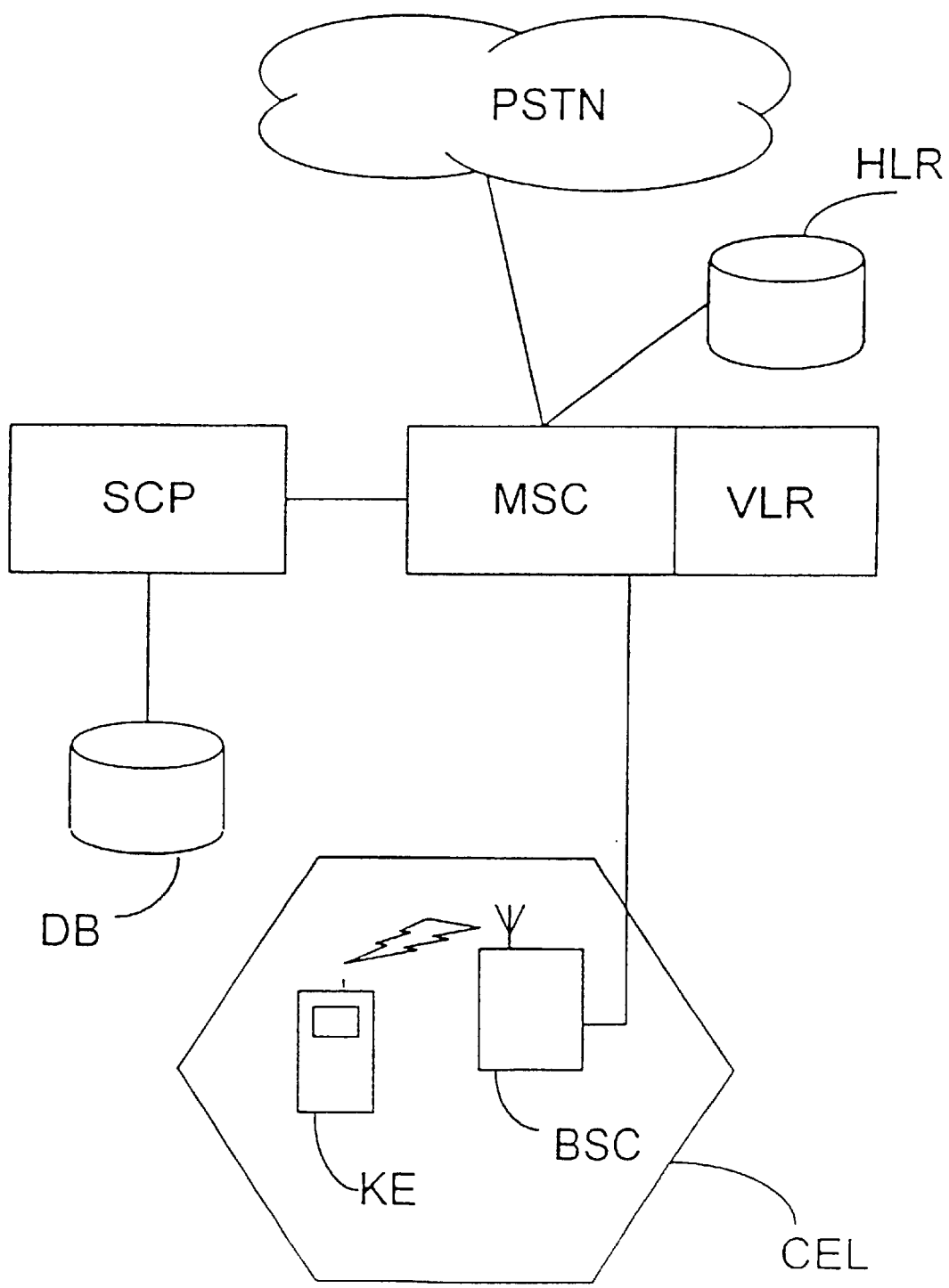
FIG. 1 is a block diagram of an exemplary configuration of a communication system with a services center implemented by intelligent networks according to ITU Q.1200 ff. for implementing a method according to the invention.

In all the figures of the drawing, sub-features and integral parts that correspond to one another bear the same reference symbol in each case. Referring now to the figures of the drawing in detail and first, particularly, to FIG. 1 thereof, there is shown an implementation of the concept according to the invention by use of a so-called intelligent network (IN). This is an architecture that, as supplementary to the existing mobile radio or telephone network, provides the possibility of implementing value added communication services.

A description of the intelligent network and the components needed can be found in ITU Standards Q.1200 ff.

The mobile radio network (for example the GSM in Europe) is divided into so-called radio cells. If a mobile terminal KE is located in such a radio cell CEL, a data transmission is carried out in the case of a mobile-terminated or mobile-originated call via a radio station, called a base transceiver station BSC, belonging to the cell CEL.

The terminal KE contains a non-illustrated subscriber identity module (SIM) card which can be removed and which contains a subscriber identity number IMSI via which the user of the terminal KE can be unambiguously identified.

The base transceiver stations BSC of the individual radio cells CEL are connected to a mobile switching center MSC via which databases including a home location register HLR and a visitor location register VLR can also be accessed.

The home location register HLR contains information on the customers of the communication network including the subscriber identity numbers IMSI, directory number (MSISDN), statistical base data, subscribed services etc. In addition, the home location register HLR contains the variable, current location area of the subscriber that is specified by the visitor location identity.

In the visitor location register VLR, the data of the subscribers are administered which are currently in the visitor location register VLR area (corresponds, as a rule, to the MSC area). In the visitor location register VLR, the dynamic component of the subscriber information is stored, a part of the information being generated by a copy of certain subscriber data from the home location register HLR.

A service control point SCP, in which the subscriber profile according to the invention is to be implemented, contains functions and intelligent network service routines that belong to the respective service requests. Apart from general instructions for sequence control, the service control point SCP contains a library of specific functions that can be called up by service routines. After acceptance of the service request, that is to say a call-setup (mobile-terminate or mobile-originated), the service routine associated with the desired subscriber profile is determined and executed. The execution of the service is influenced by service subscriber-oriented parameters.

These parameters are obtained by inquiring at a so-called service data function, for example from a separate database DB. However, the relevant data can also be determined from the home location register HLR already in existence.

The mobile switching center MSC also represents the transition into the fixed network PSTN.

The proposed procedure of the implementation has the below listed advantages. First, implementation is possible with the aid of preexisting mechanisms (CAMEL, GSM 02.78). Second, no changes are necessary in the existing components of the effective network such as the home location register HLR. Third, interworking with all other subscriber-oriented services such as the prepaid service is made possible by the centralized services logic. Fourth, separate bills are made for mobile-originated calls: the post-processing system receives an indication (operation FCI) and it is registered in the call record. Fifth, separate ringing tones can be implemented in a simple manner: the mobile-terminated call is filtered and/or diverted depending on the selected directory number MSISDN and the activation status of the respective subscriber profile. A specific ringing tone is made available by an "alerting pattern". Sixth, a "calling number identification presentation" can be performed: depending on the nature of the mobile-originated call (i.e. the selected profile), the respective associated directory number is transmitted at the same time (that is to say the private number or the business number).

The implementation by customized applications for mobile network enhanced logic (CAMEL) also guarantees that roaming is still possible without problems.

FIG. 2 shows entries belonging to the service in a subscriber database, the home location register HLR.

It can be seen here that the subscriber identity module card SIM1 with an associated subscriber identity number IMSI1, is associated with two different directory numbers MSISDNa and MSISDNb in two records in the database. The directory numbers MSISDNa and MSISDNb are in each case allocated a separate subscriber profile for mobile-terminated calls O-CSI: profile a, profile c and for mobile-originated calls T-CSI: profile b, profile d (in CAMEL terminology: the so-called "service key"). Furthermore, the table (the HLR) shows where these subscriber profiles are located, i.e. the address of the service control point SCPa, SCPb.

Depending on the dialed directory number MSISDN, the respective current profile is then selected in the service control point. Distinguishing and allocating the directory number to the profile is done by services logic in the service control point SCP.

This is clearly more flexible in comparison with a purely home location register based solution.

The profiles a, b, c, d hide a definable set of information such as, for example, time information, a black list and/or a white list, diversions and much more. The distinction between mobile-terminated and mobile-originated calls is appropriate: for example, a prepaid service can be provided in the profile, profile a, for mobile-originated calls whereas screening, i.e. a check whether it is permitted at the current time, can be provided in the associated profile b for mobile-terminated calls.

We claim:

1. A method for operating a communication terminal in a communications network, which comprises the steps of:

assigning exactly one subscriber identification module with exactly one subscriber identity number to the communication terminal;

assigning at least two directory numbers to the subscriber identity number;

assigning at least a first subscriber profile for mobile-terminated calls and a second subscriber profile for mobile-originated calls to each directory number; and determining the subscriber profile to be used in a call to or from the communication terminal using a services logic in the communications network.

2. The method according to claim 1, which comprises using a directory number dialed to indicate to the services logic the subscriber profile to be used for a mobile-terminated call.

3. The method according to claim 1, which comprises indicating, one of visually and audibly, a directory number to which the call was directed for a mobile-terminated call.

4. The method according to claim 1, which comprises indicating the subscriber profile to be used by additional signaling to the services logic from one of a user and the communications terminal for a mobile-originated call.

5. The method according to claim 1, wherein a user using the communication terminal can activate and deactivate the subscriber profile.

6. The method according to claim 1, wherein the user using the communications network can administer the subscriber profiles.

7. The method according to claim 1, which comprises providing the subscriber profile with billing information.

8. The method according to claim 1, which comprises providing the subscriber profile with time information for deciding on activations and deactivations of the directory numbers.

9. The method according to claim 1, which comprises providing the subscriber profile with information about which communication partners a call setup with is permissible.

10. The method according to claim 1, which comprises activating only one of the directory numbers having the subscriber profile at a time for the subscriber identity number.

11. The method according to claim 1, which comprises collecting calls for non-activated directory numbers in a mailbox.

12. The method according to claim 1, which comprises providing the communication network as a mobile radio network.

13. The method according to claim 1, which comprises providing the subscriber profile with information about which communication partners a call setup with is impermissible.

* * * * *